United States Patent [19]
Tenne

[11] 3,832,729
[45] Aug. 27, 1974

[54] IMAGE DIVIDING MECHANISM IN PHOTOGRAPHIC CAMERAS FOR UNPERFORATED ROLLFILM

[75] Inventor: Lave Tenne, Norrbyvallda, Sweden

[73] Assignee: Fritz Victor Hasselblad, Goteborg, Sweden

[22] Filed: Nov. 15, 1972

[21] Appl. No.: 306,660

[30] Foreign Application Priority Data
Nov. 26, 1971   Sweden............................. 15141/71

[52] U.S. Cl................. 354/213, 242/71.2, 242/71.4
[51] Int. Cl. ......................................... G03b 17/28
[58] Field of Search.......... 95/31 R, 31 AC, 31 DS; 242/71, 71.1, 71.2, 71.4, 71.5

[56] References Cited
UNITED STATES PATENTS
2,350,693   6/1944   Moomaw et al.................. 242/71.4
3,455,224   7/1969   Zimmet............................. 95/31 R Primary Examiner—Robert P. Greiner
Attorney, Agent, or Firm—Pollock, Philpitt & Vande Sande

[57] ABSTRACT

Apparatus for controlling the advance of unperforated rollfilm in a camera from a supply spool to a take-up spool. Film advancing means is provided to rotate the take-up spool by an amount which at least equals the maximum rotation of the spool required to advance the film according to the preselected spacing between successive exposures on the film. A differential responds to rotation of both the supply and the take-up reels and provides an output which indicates the extent of rotation of both the spools. The differential provides a distinctive output when the output of the differential attains a predetermined magnitude, and this output terminates further advancing of the film.

5 Claims, 1 Drawing Figure

3,832,729
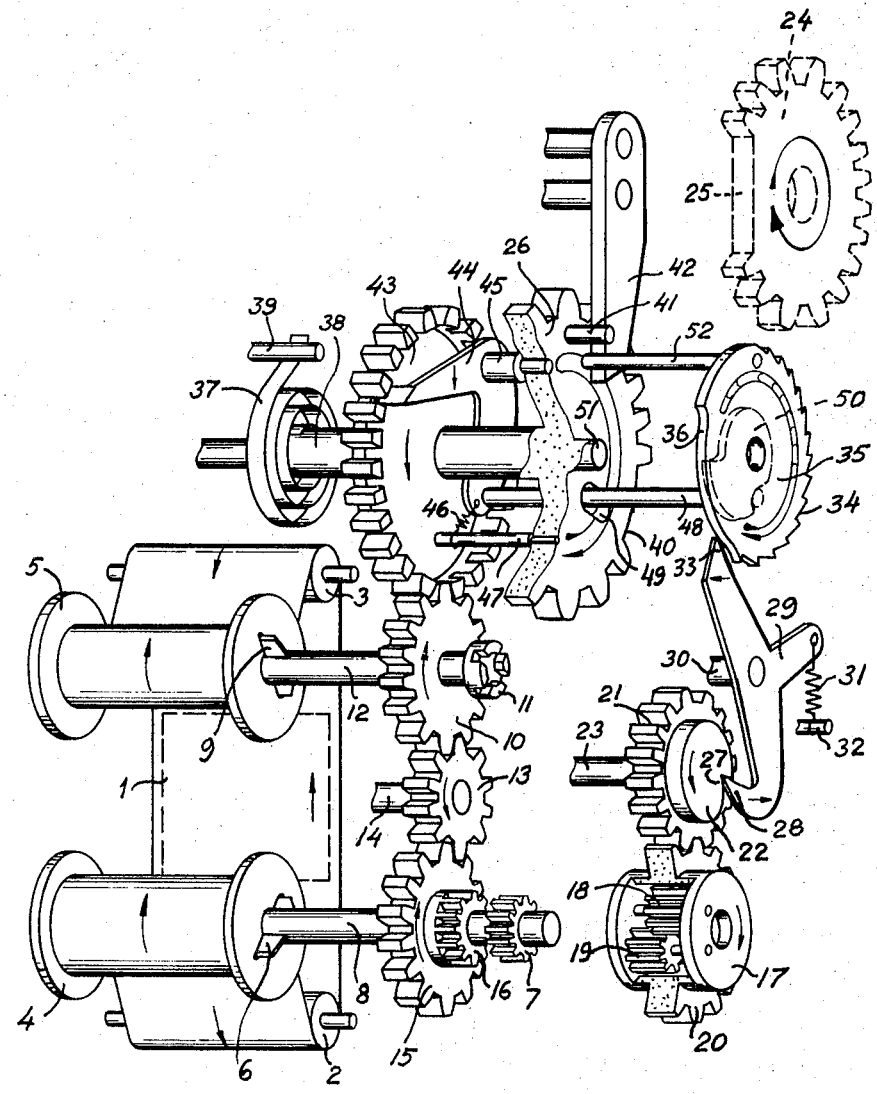

IMAGE DIVIDING MECHANISM IN PHOTOGRAPHIC CAMERAS FOR UNPERFORATED ROLLFILM

This invention relates to photographic cameras for unperforated rollfilm, preferably to cameras of the type provided with exchangeable film magazines in which a knob or crank is mounted on the camera housing for simultaneous shutter setting and film transport. The invention relates to a film advancing mechanism for unperforated rollfilm placed in the exchangeable film magazine. The film advancing mechanism is constructed as a mechanical differential, which senses the supply spool and take-up spool of the film and interrupts the film advance by means of a disengaging, stopping or braking device when the film has been advanced. The mechanism does not include friction-responsive measuring means, for example a measuring roll which, upon sliding, gives rise to advancing errors. The film advancement is practically constant and it is not affected appreciably by the film thickness, irrespective of whether the film is provided with backing paper or not, nor by varying film base thickness, diameter of the empty spools etc., which with known film advancing devices can give rise to substantial advancing errors.

To be ideal, a film advancing mechanism must advance a constant film length corresponding to a frame plus the narrow unexposed portion separating the individual frames from each other. This implies, in the practical case, that the film advancing mechanism must bring about a film advance sufficiently uniform that overlapping between adjacent frames does not occur and that the film provides sufficient space for a normal number of exposures. In the case of unperforated film, these requirements involve certain difficulties which with known film advancing mechanisms, have not been overcome entirely. The conventional mechanisms can be divided into two main types, viz. those comprising a measuring roll, and those which include an empiric curve control for interrupting the excess movement of the film advancing mechanism when the film has been advanced.

In known mechanisms comprising a measuring roll, one utilizes the friction between the film and the measuring roll, whereby the latter is forced to rotate when the film is being advanced. The roll, after having rotated through an angle corresponding to a film advance, actuates a disengaging, braking or stopping device which interrupts the further advance. A mechanism of this type has the advantage of not being affected by the thickness of the film. The length of a film advance is always the same, irrespective of the thickness of the film base and irrespective of whether or not the film is provided on its backside with a protective paper. The variations in diameter of empty spools which occur between films of different types and makes, do not affect the film advance, either. However, image advancing mechanisms with a measuring roll have the disadvantage that in practice it is difficult to avoid sliding between the measuring roll and the film. The risk of sliding is reduced by a large diameter of the roll and/or a high pressure on the film, but the limited space within the camera seldom permits the desired diameter, and an increase in the roll pressure slows the film advance. One therefore often has to accept a compromise solution, which involves a certain risk of sliding with resulting non-uniform film advance.

In known mechanisms with empiric curve control a stepped curve is applied for controlling the mechanism, which interrupts the film advance. The stepped curve, which has a shape designed for a nominal film thickness, reproduces the winding of the film on the take-up spool. Mechanisms of the aforesaid type have the advantage that they cannot slide. However, in order to be able to use the camera, or alternatively, the film magazine, with films both with and without backing paper, the advancing mechanism must be provided with a control curve for each film type plus a device for switching between the curves. This constitutes a disadvantage. From an operational point of view, furthermore, it is a disadvantage, that a variation in film thickness from that for which the stepped curve was designed gives rise to a film advance error, which error is cumulative. If the film is too thin, the distance between the frames decreases successively, which can result in a partial overlapping of the images toward the end of the film. If the film is too thick, the distance between the frames increases successively, which involves the risk that there is not sufficient space on the film roll for the last image. A deviation from the nominal diameter of the empty spools affects the length of a film advance in a similar way. Several commercially available makes and qualities of unperforated rollfilm show such a wide spread with respect to film thickness and diameter of the empty spools, that the aforesaid risk of film advance errors cannot be disregarded.

The present invention has as its object to produce a film advancing mechanism without the disadvantages shown by the known types of mechanism described above. As the film advancing mechanism according to the invention does not include friction-responsive elements for the transmission of power and motion, the risk of sliding is eliminated. The film advancing mechanism, furthermore, is designed so as to effect a substantially constant film advance for all films and spool diameters available on the market. The deviations from the accurate film advance which may occur are so small that they are of no practical importance. The reasons why such variations do occur will be explained in conjunction with the following description of the invention. Also, the relative insensitivity of the mechanism to varying film thicknesses and spool diameters renders it possible to use alternatively films with and without backing paper, provided the camera, (or in applicable cases, the film magazine) in general is constructed for this purpose. This is an advantage both for the camera manufacturer and buyer.

A feature which the film advancing mechanism according to the invention has in common with the two known types of such mechanisms described above is, that the film is advanced by rotation of the take-up spool through an angle decreasing for each frame. Contrary to what is the case with the known mechanisms, with the mechanism according the the invention, the axle of the supply spool is connected to the image dividing mechanism. At the same time, of course, this axle is connected by the film with the axle of the take-up spool whereby the axle of the supply spool is rotated by the film. The axle of the supply spool rotates more slowly than the axle of the take-up spool at the beginning of the film, but at the end of the film rotates faster than the axle of the take-up spool. This last-mentioned relation is utilized in the film advancing mechanism, in such a manner, that the axles of the film spools are connected by gear wheels to a gear differential in which the rotation angles of the spools are summed up. The angle total then constitutes, directly or geared, a measure of the film advance, in such a manner, that the differential controls a film advance wheel which, for example once per revolution, by a notch or stud, interrupts the always equally long film advancing operation, which has an excess movement, by means of a disengaging, stopping or braking device.

The film advancing mechanism does not provide an entirely constant film advancing, because the aforesaid angle total is not constant but shows small variations depending on the film quantity on the spools in question. As a result thereof, the film advance is shortest at the beginning and at the end and longest in the middle of the film. The differences in length, however, are so small that they are of no practical importance.

The length of the film advance is affected to some extent also by the film thickness, in such a way, that a film of greater thickness yields film advance somewhat longer than that yielded by a thinner film. Compared with the known film advancing mechanism having empiric curve control, the mechanism according to the invention, by its substantially lower sensitivity to variations in film thickness, can be used in cameras and, respectively, film magazines, intended for films both with or without backing paper.

An unperforated rollfilm, with or without backing paper, is preceded by and terminates in a strip of pure paper, of which the leading portion is substantially longer than the trailing portion. Accordingly, the film advance is longer at the beginning than at the end of the film. This error in film advance, however, is compensated for almost entirely by a slight variation of the gear from the respective spool axles to the differential.

A preferred embodiment of a film advancing mechanism according to the invention, which is intended for an exchangeable film magazine, is described in greater detail in the following, with reference to the accompanying drawing showing a perspective view of the mechanism. For the sake of clarity, the details are spread apart and some portions of concealing nature are cut away.

An unperforated rollfilm 1 runs over a pair of guide rollers 2 and 3 between a supply spool 4 and a take-up spool 5. The supply spool 4 is coupled with a unit comprising an axle 8 provided with a driver 6 and a stationary gear wheel 7. The take-up spool 5 is coupled together with a unit comprising an axle 12 provided with a driver 9, a stationary gear wheel and a clutch-half 11. The gear wheel 10 is connected to a gear wheel 15 rotatably supported on the axle 8 via an intermediate wheel 13, which is supported on a stationary pin 14 and reverses the motion. On said gear wheel 15 a gear wheel 16 is mounted, which has the same gear data as the gear wheel 7.

The clutch-half 11 is intended to be engaged with a device (not shown) in which the second clutch-half is comprised. Said device, which does not concern the present invention, is intended for a manual advance of the rollfilm 1 to the first frame when the film magazine is being loaded and for a final advance of the film 1 after the last frame has been exposed. The clutch-half (not shown) may, for example, be connected to a crank attached on the outside of the film magazine, and the arrangement may be provided with a resilient locking tooth, which upon clockwise rotation of the crank permits film advance, but which prevents rotation of the crank when the film 1 is being advanced by the mechanism in the camera housing. As an alternative, the crank may be replaced by a grooved knob, in which case the one-way locking means described above can be abolished, because the knob may be permitted to participate in the rotation upon normal film advance without any disadvantage.

A differential housing 17, in the drawing shown spread to the right, is supported on the right-hand end of the axle 8 and on the cylindrical surface of the gear wheel 16. The differential housing 17 includes two planetary wheels 18 and 19, the respective axles of which are supported in the end walls of the differential housing 17. The planetary wheels 18 and 19, which have a length somewhat exceeding half the distance between the end walls of the differential housing 17, are axially offset to the outer and, respectively, inner end wall and mesh with each other at a central portion, viz. where they do overlap each other. In assembled state, the gear wheel 7 and the planetary wheel 18 and, respectively, the gear wheel 16 and the planetary wheel 19 mesh with each other. The differential housing 17 is outwardly provided with a gear ring 20, which meshes with a dividing wheel 21 provided with a dividing curve 22 and is supported on a stationary pin 23.

The arrangement described above constitutes a cylindric gear differential, in which the inputs are the supply spool 4 and take-up spool 5, and the output is the dividing curve 22. At the time of film advance, the take-up spool 5 is rotated in the direction of the arrow, see the FIGURE, by means of an advancing device described below, and the diameter of the take-up spool 5 increases by the greater amount of film wound thereon. To obtain a constant film advance, i.e., a constant film transport per frame, the take-up spool 5, and therewith the details 9-16, must rotate for each frame through an angle which decreases from frame to frame. At the same time, the diameter of the supply spool 4 decreases as the film successively is wound off. As a consequence, the supply spool 4 and the details 6-8 must rotate through an angle increasing from frame to frame in order to maintain a constant length of the film delivered. The movement per film advance on the take-up spool 5 and supply spool 4, and thereby on the gear wheels 16 and 17, is summed up in the differential 17, 18, 19, and the gear ring 20 rotates through an angle per film advance which is substantially constant.

The gear ratio between the gear ring 20 and dividing wheel 21 is so chosen that the dividing curve 22 rotates one revolution per advance of a single frame in the direction of the arrow, see the FIGURE.

The film advancing mechanism is built-in as part of an exchangeable film magazine intended to be attached on a camera provided with an advancing knob for combined shutter cocking and film transport. The advance movement is transferred from the camera to the film magazine by a film transport wheel 24 located in the rear edge of the camera housing and rotating one revolution per frame advance in the direction of the arrow. Said film transport wheel 24 is provided with a tangential recess 25, which in the non-operative position shown permits a reversing wheel 26 in the film magazine to rotate freely.

As the one-revolution movement of the film transport wheel 24 cannot be applied directly to the angular rotation of the take-up spool 5, which rotation becomes shorter for each frame, a controlled disengaging device is placed between the film transport wheel 24 and the gear wheel 10, in such a manner, that the disengaging device receives from the film transport wheel 24 an angular motion of a magnitude sufficient for the first frame when the diameter of the take-up spool 5 is the smallest. For successive frames the angular motion is interrupted at different angles in order to advance a constant film length per frame.

Said disengaging device is operated by the differential described above; more precisely, by the dividing curve member 22 rotating one revolution per frame advance, which curve is provided in the periphery with a recess 27. A disengaging arm 29 supported on a stationary pin 30 and loaded by a tension spring 31, which is mounted on a pin 32 and tries to turn the disengaging arm 29 clockwise in the FIGURE, is provided with a sensing member 28, which for each revolution of the dividing curve 22 falls down into the recess 27 and at the beginning of the next revolution again is lifted up onto the periphery of the dividing curve 22. The disengaging arm 29 is provided at its upper end with a tooth 33, which at the fall-down of the sensing member 28 into the recess 27 falls down into one of the tooth gaps 34 in a ratchet wheel 35 and thereby stops said wheel immediately. On the ratchet wheel 35 a free-run recess 36 is so arranged that the tooth 33 is able to stop the movement of the ratchet wheel 35 at the beginning of a film advancing cycle only after the sensing member 28 has been fed up onto the periphery of the dividing curve 22.

The reversion wheel 26 tries to rotate clockwise by action of a torsion spring 37, which is fastened at the axle 38 of the reversion wheel 26 and with its other end rests against a stationary pin 39. At the time of film transport, the film transport wheel 24 in the camera housing engages with a recess 40 in the reversion wheel 26, in which one tooth has been removed, and thereby, in the embodiment shown, rotates the reversion wheel 26 counter-clockwise through a distance slightly less then one revolution. The film transport wheel 24 thereafter disengages from the reversion wheel 26 when the recess 25 arrives at the reversion wheel 26, which thereby rotates clockwise by action of the torsion spring 37 back to the starting position and is stopped in a position, which is determined by a pin 41 fixed in the reversion wheel 26 and by a stationary pin 42.

A disengaging wheel 43 supported on the axle 38 and meshing with the gear wheel 10 is thereby connected with the take-up spool 5. The disengaging wheel 43 is rotated counterclockwise by the reversion wheel 26 by means of a one-way locking means, which comprises a catch 44 supported on a pin 45 in the reversion wheel 26, which catch by action of a tension spring 46 fastened at a pin 47 tries to rotate clockwise. Thereby, the disengaging wheel 43, which on its inside is provided with a locking ring formed in the embodiment shown by the inside surfaces of the teeth, is forced to participate in said rotation. The catch 44 is released in that a pin 48 is moved aside in radial direction. The pin 48 is fastened at the catch 44 and extends through a free-run bore 49 in the reversion wheel 26. The pin 48 rests by action of the tension spring 46 against a cam curve 50 arranged on the remote side of the ratchet wheel 35; more precisely, the pin rests in a depression in said curve, whereby it is possible for the pin 48 to take along the cam curve 50.

The ratchet wheel 35 is supported on an axle journal 51 on the reverse wheel 26. At the beginning of a film advance, the reversion wheel 26 takes along both the disengaging wheel 43 and the ratchet wheel 35. When then the dividing curve 22 has rotated one revolution, the sensing member 28 falls down into the recess 27, and the tooth 33 falls down into one of the tooth gaps 34 and stops the ratchet wheel. Due to the continued rotation on the reversion wheel, the cam curve 50 lifts out the pin 48 which turns the catch 44 so that it releases the locking ring in the disengaging wheel 43, which then stops while the reversion wheel 26 completes its movement. When thereafter the reversion wheel 26 returns to the starting position, it takes along also the ratchet wheel 35 to the starting position for the pin 48, which thereby falls down into the depression in the cam curve 50. The starting position is thereafter guarded in that the ratchet wheel 35 is provided with a pin 52, which like the pin 41 stops against the stop member 42.

The film advancing mechanism according to the invention is not restricted to the embodiment shown, but it may be varied substantially within the scope of its basic idea. The invention, for example, can be applied to cameras both with and without exchangeable film magazines. The differential may alternatively be provided with bevel gears or be designed as a mechanical differential of some other kind. The location of the differential is not restricted to the axle 8 of the supply spool 4, but may alternatively be connected to the intermediate wheel 13 or to the axle 21 of the take-up spool 5. The disengaging device comprised in the invention may alternatively be rotated through an entire revolution or more if the stop member 42 is made resilient in clockwise direction. If it is deemed suitable, the disengaging device may alternatively be designed as a friction clutch. The gear ratio between the gear wheels 10 and 15 may, as mentioned above, be varied somewhat about the ratio 1:1 in order to adjust the film advance to different lengths of the paper strips provided as leading and trailing pieces of an unperforated rollfilm. The gear ratio to the dividing wheel 21 may, if deemed suitable, be such that the dividing wheel 21 rotates part of a revolution, for example one half or one third of a revolution per operation cycle, in which case the dividing curve is provided with two and, respectively, three recesses 27.

I claim:

1. Apparatus for controlling the advance of unperforated rollfilm in a camera from a supply spool to a take-up spool comprising:

film advancing means operatively connected to said take-up spool and effective on each operating cycle thereof to rotate the take-up spool by an amount at least equaling the maximum rotation of the take-up spool required to advance the film according to the preselected spacing between successive exposures, differential means responsive to the rotation of both said supply and take-up spools upon each actuation of said film advancing means for providing an output manifestation representative of the extent of rotation of both said supply and take-up spools, and means responsive to said differential means for controlling said film advancing means to terminate the advance of the film when the output of said differential attains a predetermined magnitude.

2. The apparatus of claim 1 wherein said differential comprises a plurality of gears.

3. The apparatus of claim 2 wherein the output of said differential comprises a gear element which rotates one revolution for each advance of the film.

4. The apparatus of claim 1 wherein said differential comprises a cam surface and a spring-biased pivotally supported cam follower, a ratchet wheel which is rotatable in response to actuation of said film advancing means, said cam follower in response to said cam surface of said differential engaging said ratchet wheel upon attainment by said differential output of its said predetermined magnitude to thereby lock said ratchet wheel at some point in its rotation, and means responsive to the locking of said ratchet wheel for terminating the advance of the film by said film advancing means.

5. The apparatus of claim 4 which further includes a rotary gear element for rotating said take-up spool, a second rotatable element selectively engageable with said rotary gear element to rotate said take-up spool, and means operatively connecting said ratchet wheel with said second element, said locking means upon the locking of said ratchet wheel disengaging said second element from said rotary gear element to thereby stop further rotation of said take-up spool.

* * * * *